Figure 1:
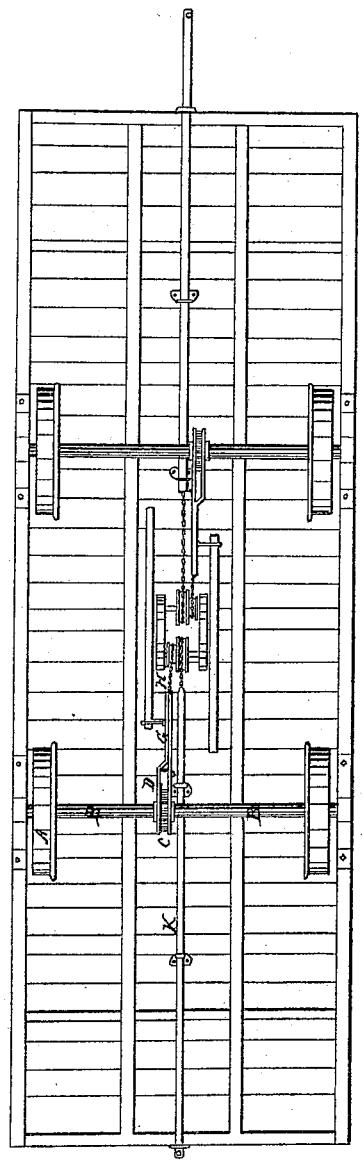

G. P. FRICK.
Car Starter.

No. 24,293.

2 Sheets—Sheet 1.

Patented June 7, 1859.

Witnesses:

Inventor:

G. P. FRICK.
Car Starter.
No. 24,293.
2 Sheets—Sheet 2
Patented June 7, 1859.
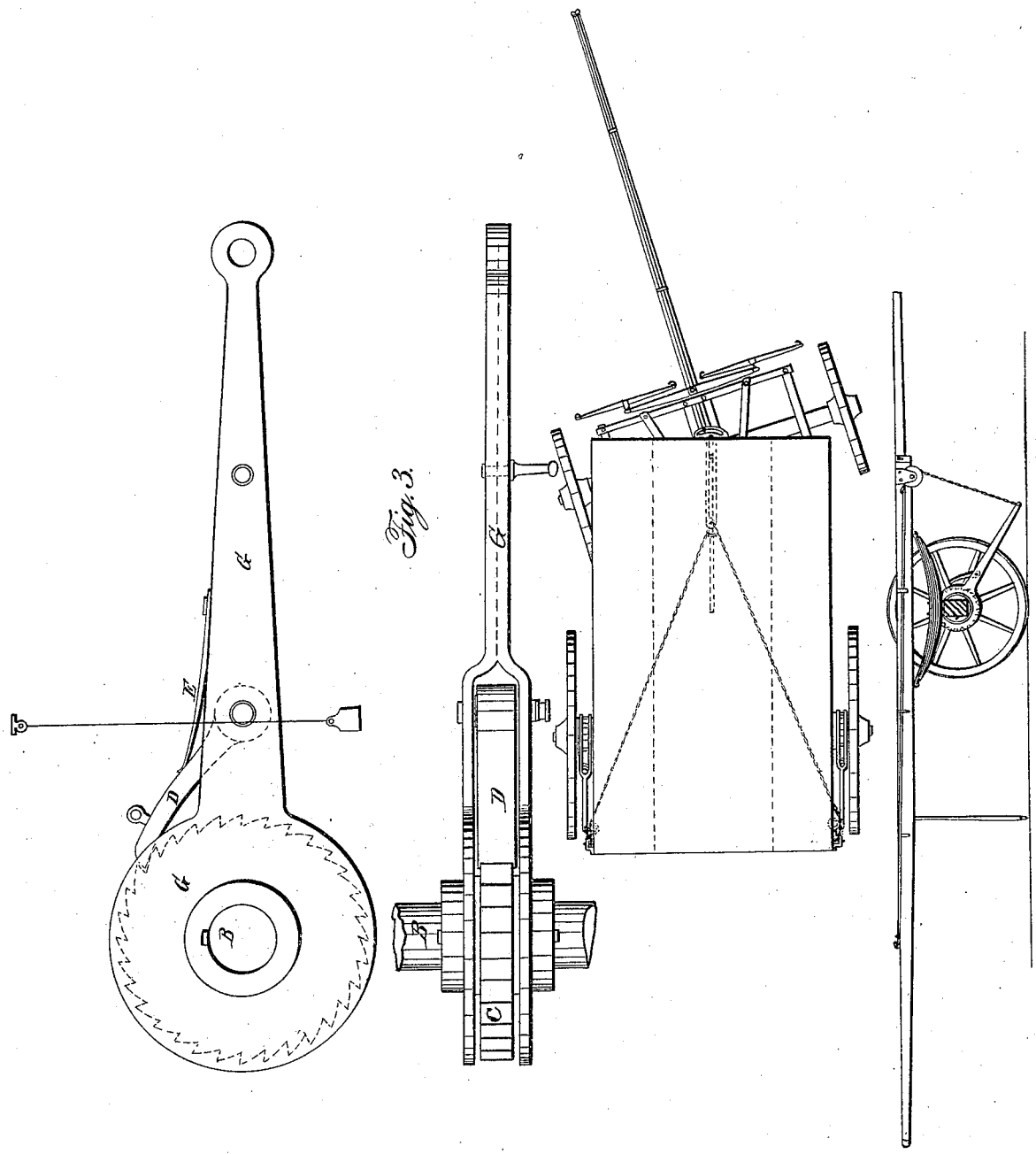
Witnesses:
Inventor:

UNITED STATES PATENT OFFICE.

GEORGE P. FRICK, OF BALTIMORE, MARYLAND.

MODE OF STARTING CITY RAILROAD-CARS.

Specification of Letters Patent No. 24,293, dated June 7, 1859.

*To all whom it may concern:*

Be it known that I, GEORGE P. FRICK, of Baltimore, Maryland, have invented a new and useful Improvement in Wheeled Vehicles, which is particularly adapted to railway-carriages drawn by horse-power, and that the following is a true and exact description of my said improvement.

The object of my improvement is to facilitate the overcoming of the *vis inertia* of the vehicle loaded or unloaded, or of obstacles of any kind in its way at the instant of starting or commencing motion, which I do, by the application of a lever acting temporarily upon the axle and operated by the draft, fashioned and arranged substantially as follows:

I suppose the case, for illustration, of a street railway carriage on four wheels, each axle being treated in the same manner. I fasten to the center of the axle, nearly, a cast iron ratchet wheel of about eight inches in diameter, from which the lever extends toward the center of the carriage, of a length, depending in some degree, upon the length of the vehicle; the near end of the lever is forked so as to admit the ratchet wheel in the fork, and each end of the fork is made to embrace the axle, but without interfering with the free revolution of the latter. Upon the upper side of the lever I place a strong catch which is pressed by a suitable spring against the teeth of the ratchet wheel. To the far end, or end nearest the center of the vehicle, I attach a chain, which passes around a pulley firmly fastened in the center nearly of the floor frame work of the carriage, and is carried forward to the draft bar or rod to which the motive power is applied.

When the carriage is at rest the movable end of the lever is within a short distance of the ground and at right angles, or as nearly so as may be, with the lever in the chain leading around the pulley, the catch being pressed by the spring upon the teeth of the ratchet. When the power is applied to the draft rod the end of the lever is raised and operates through the catch and ratchet upon the axle, and the carriage is started with a power greater than could be employed in the usual way in the ratio of the length of the lever to the radius of the carriage wheel. The power is greatest at the beginning of the draft, or when the chain is tangential, or as near as may be, to the arc described by the lever, diminishing as the lever approaches the pulley, and when the chain and lever coming into line with each other the latter ceases to operate, and the draft becomes that which is due to the wheels of the carriage.

The inequality of the motion of the carriage, or the slightest check in the speed of the horses, loosens the catch, and the lever falls into its normal position to be called into play again when the wheel requires starting anew. Or to prevent the action of the lever, except at starting, as well as to obviate any objectionable clatter of the latch upon the teeth of the ratchet wheel, I attach a cord to raise the catch which I lead to where the driver can, by drawing it tight, and so raising the catch, prevent the action of the lever until absolutely required.

In the above description, I rely, as will be seen, upon the weight of the lever to restore it to its normal position, when no longer required as an extra power. Should the weight not be sufficient it will be very easy to insure its falling into such position by a suitable spring which may be made to operate to this result in many ways.

It will be observed from the foregoing that the greater power of the lever is gradually merged into the lesser power due to the leverage of the wheels, as the angle between the chain and lever increases from a right angle, or the chain and lever approximate a right line, so that there can be no jar when the extra power, so to speak, ceases its action, which I hold to be a commendable feature of my invention. The same contrivance is attached to each axle of the carriage, in view of the power being applied at opposite ends of the vehicle alternately; and it is in view of this that I speak of the ratchet wheels being in the center of the axles nearly. They are so far from the center only as is required by position of the pulleys on the same shaft around which are passed the lever chains.

Figure 2:
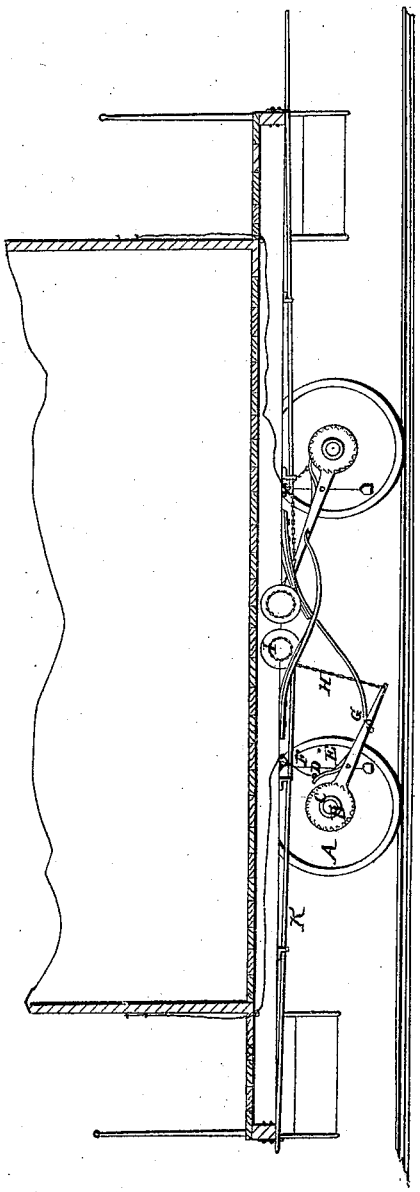

In the accompanying drawings Figure 1, represents the plan, and Fig. 2 the elevation of a car fitted up with my improvement, the same letters indicating the same parts in both figures. Fig. 3 represents an enlarged view of the ratchet and lever arrangement.

A is the carriage wheel; B the axle; C the ratchet; D the catch; E the spring; F the spring cord; G the lever; H the chain; I the pulley; and K the draft rod.

In Fig. 1 one lever is represented at rest in its normal position, and the other in action, and, comparing the two, what I have said in regard to the merging of the extraordinary into the ordinary power employed will be readily understood.

Drawing Fig. 4 represents the application of my improvement to a common dray, the ratchets, catches and levers being attached to the inside of the hubs, and the draft rods being carried forward to the collar of the horse.

Drawing Fig. 5 represents the application to the hind wheels of a common road wagon, the chains in this case being made fast to a bar in connection with the swingletrees, as shown in the drawing.

In the foregoing description I have spoken of a cord passing from the catch to a position within easy reach of the driver, so that he might raise the catch when the action of the lever was no longer wanted, and so obviate any clatter or noise of the catch against the ratchet wheel on the axle: but the same result may be brought about by the motion of the draft rod so as to make the contrivance for raising the catch a self acting one, in which case the spring pressing down the catch may be omitted as thus I extend the axle on which the catch turns, and to which it is fastened, at one end beyond the lever as represented at M Fig. 3, and I suspend by a suitable chain (Q), a weight, from the body of the carriage directly above such extension, taking one or two turns of the chain around it, as shown at M Fig. 3.

Now it is at once apparent, on an inspection of the drawing last referred to, that when the lever G falls the chain Q around the axle kept tight by the weight, must cause the axle to revolve from left to right, or in the direction of the arrow, whereby the catch is raised from the ratchet wheel: and so when the end of the lever G is raised, which is the case when the carriage is to be started, the axle revolving under the operation of the chain and weight, in the contrary direction, the catch falls at once into the teeth of the ratchet wheel, and the lever is brought to bear upon the axle of the carriage. As may be readily seen, a spring may be easily arranged in many ways, to answer the purpose of the weight.

In the foregoing description also, I have, for the sake of simplicity, referred to the pulley over which the lever chain passes, as of an uniform size; and this form of construction would doubtless produce admirable results. But a still greater degree of efficiency may be obtained by using two pulleys in each case on the same axle but of a different radii, as represented in the drawings at H and attaching the chain leading to the lever to the smaller pulley, where the lever, if prolonged, would strike it, while the chain from the draft rod is attached to the larger pulley tangentially, as shown in the drawings at H. Now it is at once apparent, that at the commencement of the action of the draft rod, upon the larger pulley, the smaller pulley may, in consequence of the lever chain being in a line with its center, be regarded as a point, almost, when the gain in power due to the difference in the diameters of the pulleys would be at its maximum. Such gain diminishing as the operation went on, until it became what was due to the difference between the diameter of the pulleys respectively. When it is recollected, that it is at the instant of starting the greatest power is wanted, this peculiar adaptation of pulleys becomes important; operating in fact to facilitate the application of the principle of my invention, and enabling me to dispense with so long a lever as might otherwise be desirable.

Other applications of the same arrangement, modified by circumstances, may easily be made.

What I claim as new, and desire to secure by Letters Patent, in the above described improvement, is:

1. The application of a lever acting temporarily upon the axle of a railway carriage or other wheeled vehicle, in combination with the pulley and chain, substantially as set forth, and whether the pulley is of uniform or different diameters as described.

2. I also claim such lever in combination with the ratchet wheel and catch, substantially as set forth in their application to a railway or other wheeled vehicle.

3. I also claim the cord whereby the lever may be loosened from the catch, at the will of the driver, in combination with the said lever and catch pulley and chain when applied to a railway carriage or other wheeled vehicle.

4. I also claim the combination of the catch and ratchet wheel, with the chain and weight described in the foregoing specification, whereby the engaging and disengaging of the catch is operated by the motion of the draft bar, substantially as described.

GEO. P. FRICK.

Witnesses:
W. W. CARTER,
OSMUN LATROBE.